July 14, 1970   F. G. A. STENBERG   3,520,105
MACHINE FOR FEEDING OBJECTS TO BE PACKED
ONTO PLATES, TRAYS OR THE LIKE
Filed Nov. 3, 1967   5 Sheets-Sheet 2

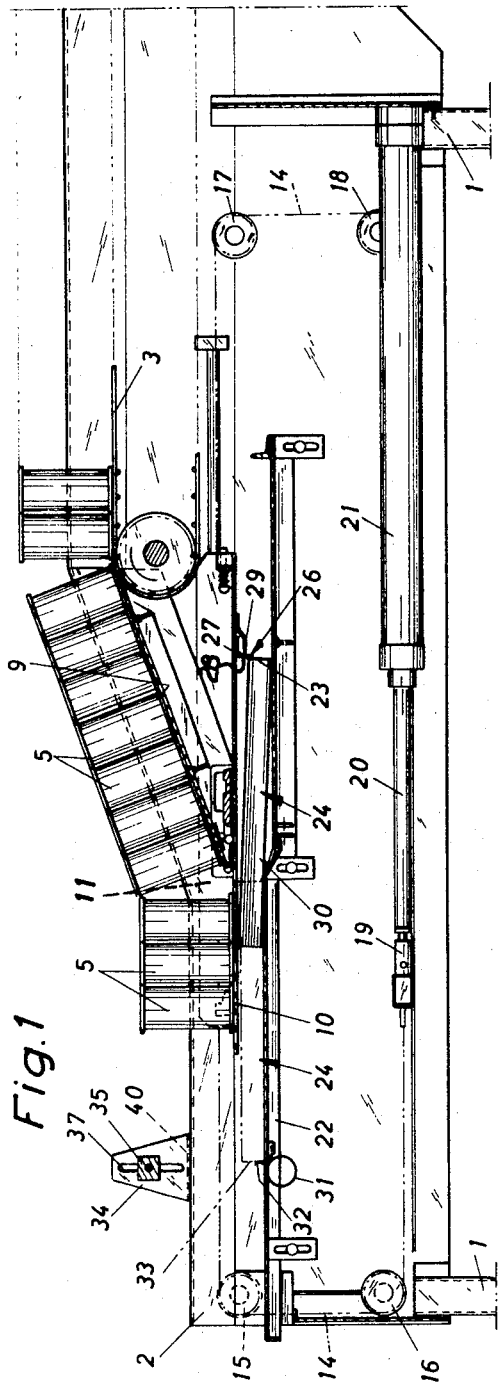
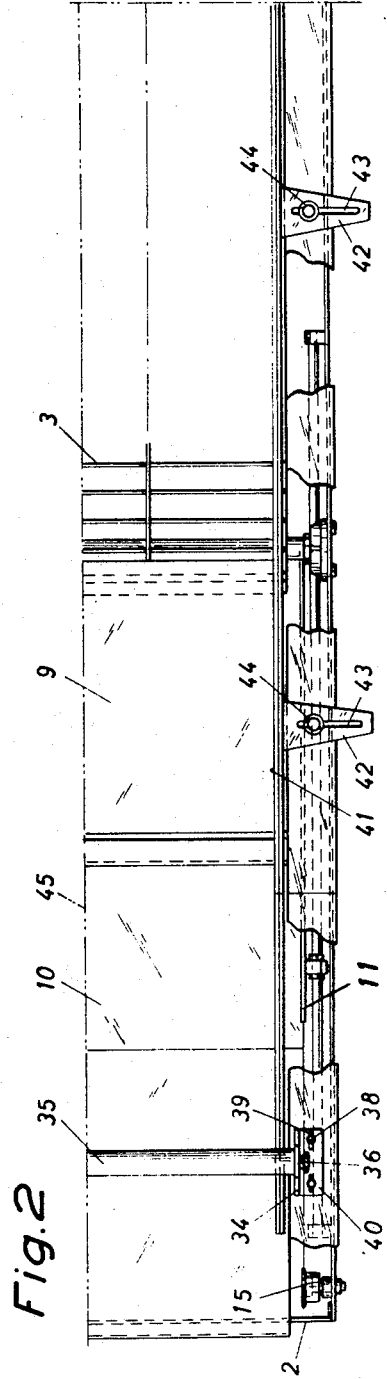

INVENTOR
Folke Gustav Adolf Stenberg
BY
Wadsworth, Sind & Powell
Attorneys

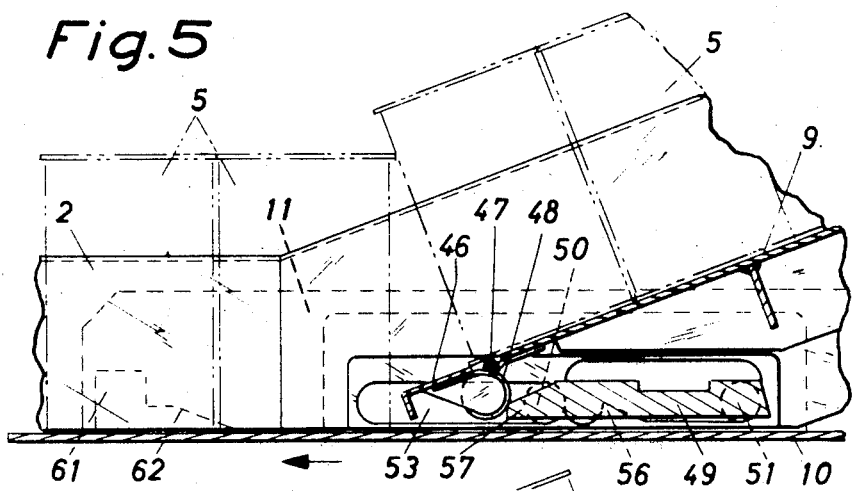
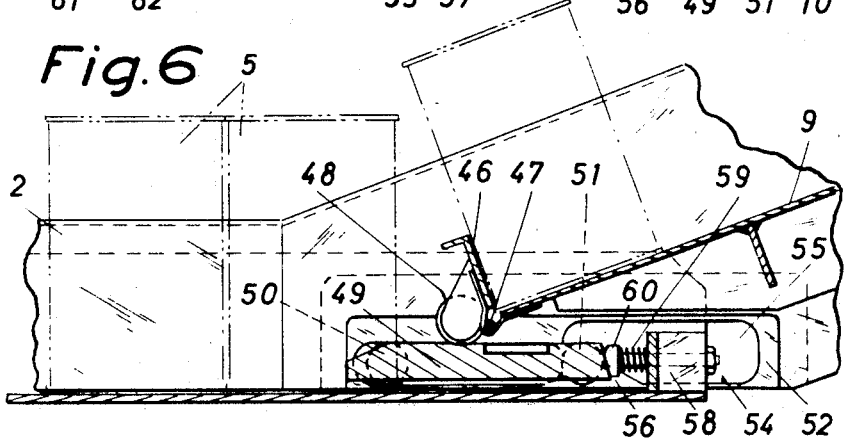
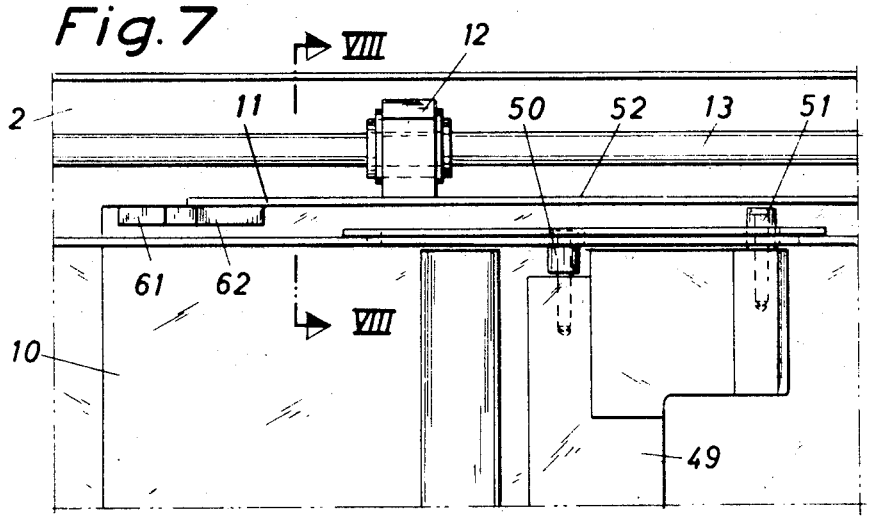

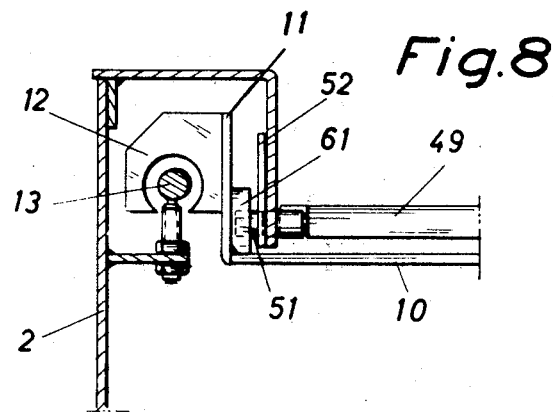
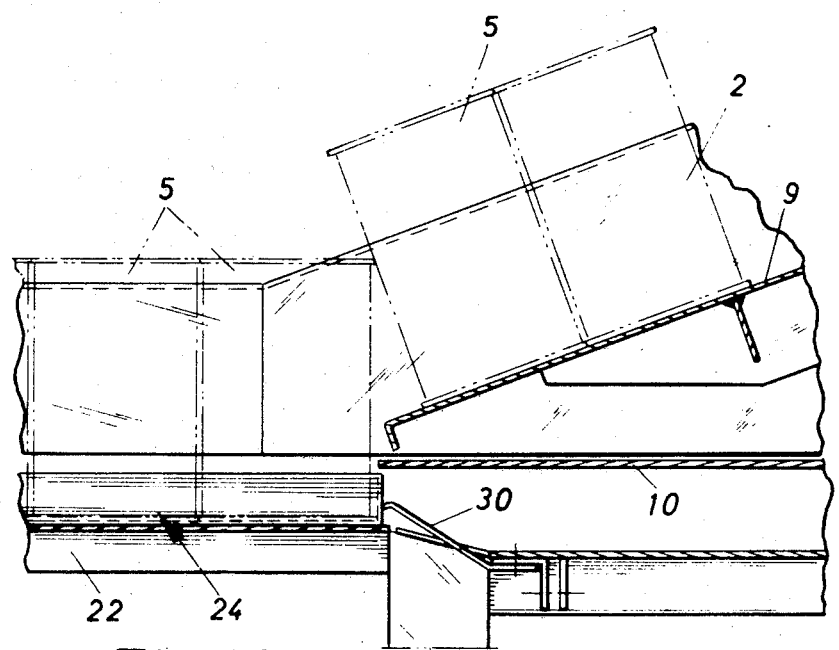

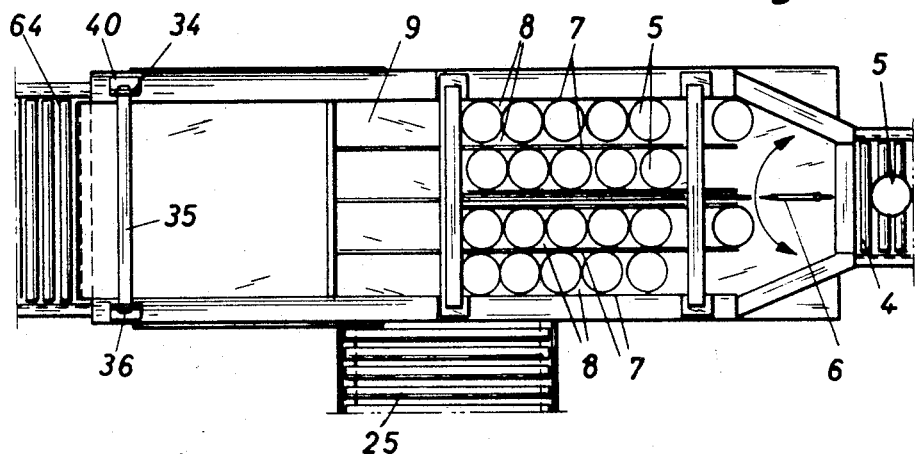
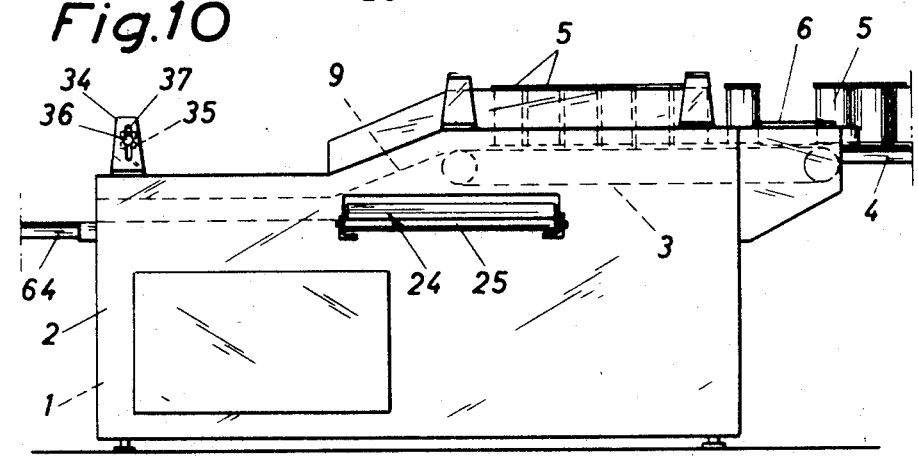
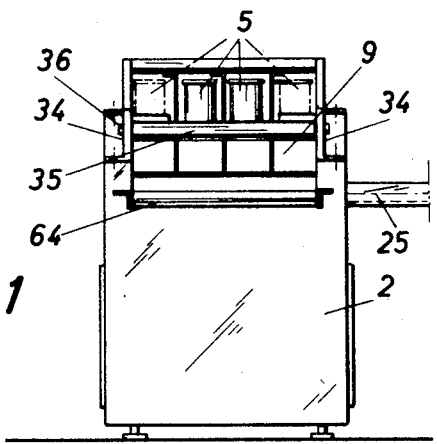

United States Patent Office 3,520,105
Patented July 14, 1970

3,520,105
MACHINE FOR FEEDING OBJECTS TO BE PACKED ONTO PLATES, TRAYS OR THE LIKE
Folke Gustav Adolf Stenberg, Kungalv, Sweden, assignor to Aktiebolaget Iwema, Goteborg, Sweden, a corporation of Sweden
Filed Nov. 3, 1967, Ser. No. 680,409
Claims priority, application Sweden, Jan. 30, 1967, 1,289/67
Int. Cl. B65b 5/10
U.S. Cl. 53—244                         3 Claims

ABSTRACT OF THE DISCLOSURE

The present invention relates to a machine for feeding uniform objects to be packed, such as cans and boxes, onto trays and the object of the invention is to ensure the best possible filling of these trays. This has been achieved by means of letting the objects slide down an inclining plane in rows from a conveyor to a carrying plate and by arranging a device for displacing the trays to be filled with objects one by one below the carrying plate and a device for preventing the objects to be packed to slide down from the inclining plane when the carrying plate is in its rearmost position.

---

Figure 3:
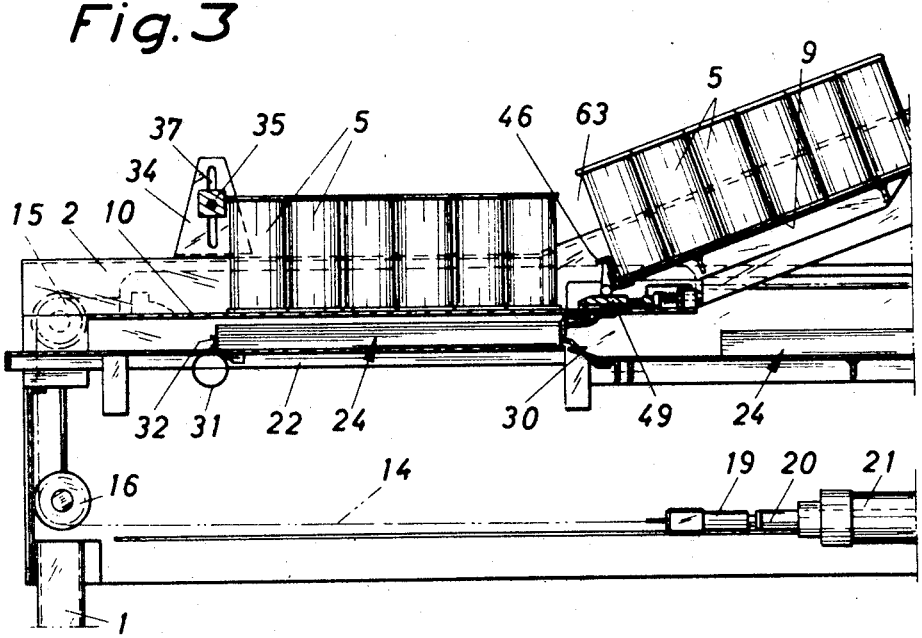

The present invention relates to a machine for displacing from a conveyor or the like onto trays a certain number of uniform objects to be packed, such as cans, boxes and the like. The trays should be filled as much as possible with objects.

The invention relates to packing machines of the kind referred to in which are contained a carrying plate which is displaceable reciprocally in a direction parallel to the longitudinal direction of the conveyor. The plate is adapted to carry objects to be packed delivered from the conveyor. A stationary abutment is situated above the front end of the carrying plate when the plate is in its foremost position, and this abutment limits the feeding of the objects to be packed onto the tray and a path extends below the plate parallel to the direction of displacement of the plate. The main feature of the invention is in an inclining plane extending between the conveyor and the carrying plate for enabling objects to be packed to slide down, a device for the displacement of trays one by one below the carrying plate to the foremost position of the same simultaneously with the displacement of the tray to its foremost position, and a latching device for preventing the objects to be packed from sliding down off the inclining plane when the plate is in its rearmost position.

The abutment for the limitation of the feeding of the objects to be packed on the carrying plate is preferably adjustable in vertical direction as well as in the direction of displacement of the carrying plate. This makes it possible to adjust the machine from the packing of objects of one dimension to the packing of objects of another dimension. For the same purpose the machine should be provided with rails displaceable in lateral direction and adapted to guide the objects to be packed during their feeding.

Figure 4:
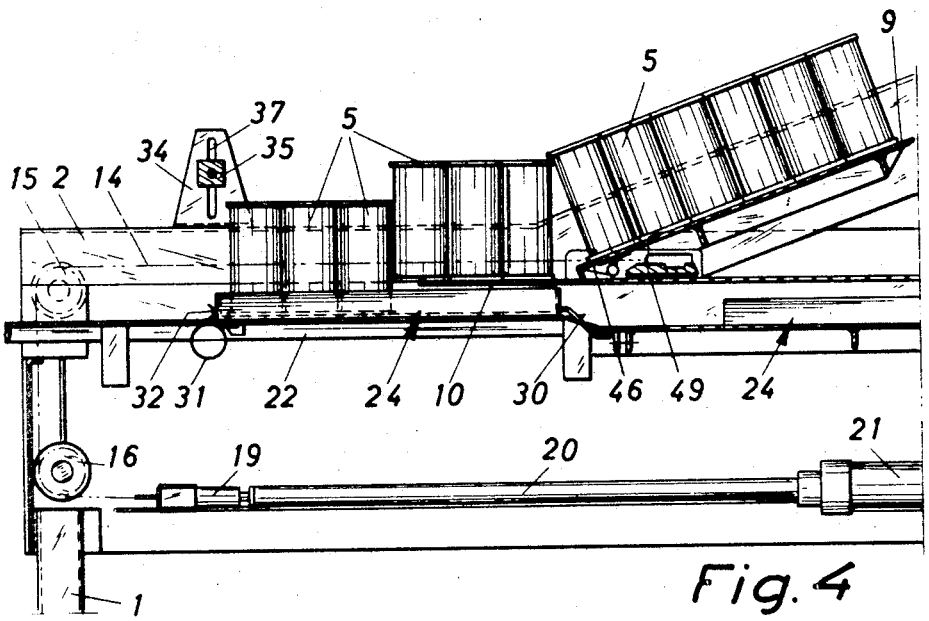

Further features of the invention will be obvious from the following description with reference to the accompanying, partly diagrammatical drawings. In the drawings:

FIG. 1 shows a vertical section through a packing machine according to the invention, FIG. 2 is a plan view of the left hand side—with regard to the displacement direction of the objects to be packed—of the machine with certain parts removed for simplification of the illustration, FIG. 3 shows a vertical longitudinal section of the machine near its discharge end and with the carrying plate of the machine in its foremost position, FIG. 4 shows a longitudinal section similar to the one in FIG. 3 but with the carrying plate in its rearmost position, FIG. 5 shows on an enlarged scale a vertical longitudinal section through the machine at the lower end of its inclining plane showing the carrying plate during the displacement in forward direction, FIG. 6 shows a similar section but illustrating the carrying plate in its foremost position and with the latch at the lower end of the inclining plane folded up, FIG. 7 is a plan view of the right hand side of the machine portion according to FIG. 6, FIG. 8 shows a vertical cross section on the line VIII—VIII in FIG. 7, FIG. 9 is a plan view of the receiving end of the machine seen from the discharge end of the same, FIG. 10 is a side elevation of the machine, FIG. 11 is an end elevation of the machine as seen from its discharge end, and FIG. 12 shows a longitudinal section of the central portion of the machine similar to the one shown in FIG. 5 but showing a somewhat modified embodiment.

The machine has a stand 2 carried on legs 1 and this stand is at its right end— according to the drawings— provided with a band conveyor 3 which at its right hand end receives successively cans 5 (or other objects to be packed of uniform shape) arriving on a roller conveyor 4. A spreading arm 6 which is swingable in a vertical plane is carried above the band conveyor 3 for guiding the cans 5 into different pens 8 confined in lateral direction by guiding rails 7. The left hand end of the conveyor 3 is connected to an inclining plane 9 the lower end of which is situated above a carrying plate 10 which is displaceable forth and back in the longitudinal direction of the conveyor 3 or parallel to this direction. The side walls 11 (one of which is shown in FIG. 8) of the same are provided with roller guides 12 running on parallel carrying rods 13 at the longitudinal sides of the stand 2. At the front and rear ends of the carrying plate 10 are attached the ends of a roller chain 14 (or a similar flexible motion transmitting means) which runs over pulleys 15, 16, 17, 18 and is attached to the outer end 19 of the piston 20 in a double-acting hydraulic piston and cylinder unit 21. Below the carrying plate 10 there is arranged a path 22 extending in the longitudinal direction of the machine for trays 24 having upstanding walls 23, said trays 24 being fed into the machine on a lateral conveyor 25 (FIGS. 9-11). The carrying plate 10 is on the under side provided with a driver 26 which comprises a flap 28 journalled about a horizontal pivot shaft 27, said flap 28 abutting in the lower position against the free end of a blade spring 29 and catching the rear wall 23 of a tray 24 fed into the machine from the conveyor 25. The path 22 is provided with a springing abutment 30 and at the front end of the path 22 there is arranged a helical spring 31 the free end 32 of which extends up into the movement path 22 of the front wall 33 of a tray 24 being fed.

Two brackets 34 are arranged above the spring 31 at the top of the stand 2 and a beam 35 extends between said brackets 34 for serving as an abutment for limiting the feeding of the cans 5 with the carrying plate 10. The beam 35 is at its ends attached to the brackets 34 by means of a screw 36 which extends through a vertical slot 37 in the bracket 34 in question. This makes the beam 35 adjustable to the desired level above the carrying plate 10. The brackets 34 are in a corresponding way displaceable on the stand 2 in the longitudinal direction of the same and adapted to be arranged on the stand by means of bolts 38 extending through slots 39 in the base plate 40 of the bracket 34 in question.

Along the sides of the stand 2 there extend two guiding rails 41 (only one shown in FIG. 2) which are parallel to the path 22 and each rail 41 is provided with two laterally directed flanges 42 each one of the latter provided with a long slot 43 which extends in the crosswise direction of the machine. A bolt 44 extends through each one of the slots 43. By means of the bolts the rails may be locked at the intended distance from the longitudinal central line 45 of the machine. The rails fulfill the purpose of guiding the cans 5 at their feeding.

The lower portion of the inclining plane 9 comprises a flap 46 which can journal about a horizontal pivot shaft 47. The flap 46 is on its under side provided with a roller 48 which, when the flap is folded down, is situated in the movement path of a slide 49. This slide 49 is at its ends provided with two horizontal rollers 50 and 51 by means of which either end of the slide is guided in a fixed guide 52 internally on each longitudinal side of the stand 2. The slide 49 is displaceable with the front rollers 50 sliding in each their horizontal notch 53 in either guide 52 and with the rear rollers 51 sliding on the lower border 44 in a horizontal notch 55 in the same guide 52, last mentioned notch 55 at the front end being provided with an upstanding abutment 56. The slide is shaped with a rebated front portion 57 in the shape of a wedge. The two rear rollers 51 extend completely through the notches 55 and their outer end is situated in the path on the one hand of a piston 60 which is displaceable rearwards against the action of a helical spring 59 serving as a buffer and on the other hand of an upstanding abutment 61 at the front end of the carrying plate 10, said abutment provided with a rearwards and downwards inclining portion 62.

For the explanation of the operation of the machine it is assumed that the different parts of the machine are in the positions shown in FIG. 3. Thus, the carrying plate 10 is in the foremost position and carries a number of cans 5 placed close to each other. A tray 24 is situated below the carrying plate 10. The flap 46 is folded up in the interspace 63 between the cans on the carrying plate 10 and the cans on the inclining plane 9 which thus are prevented from sliding downwards by the flap 46. When pressure liquid is fed to the rear end (the right hand end according to FIG. 1) of the hydraulic cylinder 21, the piston 20 is moved out (to the left) of the cylinder and the carrying plate 10 is pulled rearwards (to the right). The row of cans 5 closest to the abutment beam 35 then will first fall straight down on the tray 24 and then one row after another will fall down until the carrying plate 10 reaches its rearmost position. Just before the carrying plate 10 reaches its rearmost position, the abutments 61 reach with the inclining part 62 the rear rollers 51 on the slide 49 and lift these rollers such that they will pass over the abutments 56 whereupon the slide 49 is brought along to its rearmost position (FIG. 5) at which the contact between the front portion 57 of the slide and the roller 48 on the flap 46 is interrupted. The flap 46 then falls by its own weight assisted by the force from the cans 5 sliding down on the inclining plane 9. The lowermost row of cans on the inclining plane 9 is stopped in its movement by abutment against the rearmost row of cans now situated on the tray 24. The carrying plate 10 turns automatically when it has reached its rearmost position —due to the fact that pressure medium now instead is fed to the front end (the left hand end according to FIG. 1) of the cylinder 21—and when the carrying plate is displaced in forward direction (to the left), it abuts with the front edge against the cans on the tray 24 which thereby is displaced out of the machine at the discharge end of the same (the left hand end according to FIG. 1) when it is fed further by means of a conveyor 64 (FIG. 9). During the displacement in forward direction of the carrying plate 10 the rows of cans 5 will slide down the inclining plane 9 and over onto the carrying plate 10 and new cans are fed with the conveyor 3. During the displacement in forward direction of the carrying plate 10 the driving flap 28 catches behind the rear border 23 on a plate 24 fed from the conveyor 25 to its initial position and feeds this tray 24 simultaneously pressing down the latching abutment 30 to a position in which the tray with its front border 33 abuts against the spring end 32 whereat the spring 31 is somewhat compressed. In the foremost position of the carrying plate 10 the front row of cans 5 abuts against the arresting beam 35. When the piston 60 at the end of the displacement of the carrying plate 10 in forward direction abuts against its roller 51, the slide 49 is displaced to its foremost position (FIG. 6) whereby the flap 46 is folded up and prevents further feeding down of cans 5 from the inclining plane 9. When the feeding pressure on the carrying plate 10 after a short time period has been brought to cease, the spring 31 can bring the tray 24 back to abutment against the latch abutment 30 which, when the tray has passed the same, springs up to the initial position. It is thereby ensured that the trays always take the correct position for being filled. The carrying plate 10 is then returned to the initial position (the rearmost position) and the cans fall in the way described vertically straight down onto the tray 24. At the return movement, the flap 28 slides over the borders of a new tray fed from the conveyor 25 without influencing the same, for the reason that the flap 28 quite simply is folded up against the under side of the carrying plate 10 and will in the rearmost position of the carrying plate by its weight fall down to vertical position supported by the spring 29 and be in position for renewed feeding.

For the reason that the lower row of cans situated on the inclining plane 9, as obvious from FIG. 12, are stopped by abutment against the readmost row of cans 5 brought down onto the tray 24 upon return of the carrying plate 10 to the rearmost position, the latching flap 46 could probably be completely dispensed with and the inclining plane 9 be shaped in one single piece. One condition for this is, however, that the pressure from the subsequent cans will not be so high that the tray 24 with the cans 5 by this pressure will be able to be discharged from the machine by overcoming the force of the spring 31.

The invention has been described in the aforegoing for purposes of illustration only and is not intended to be limited by this description or otherwise except as defined in the appended claims. Thus, the different parts of the machine may be constructively modified in many ways without departure from the inventive idea. The machine could be used for the packing of other uniform objects than cans 5, e.g. boxes. The cylinder 21 may act pneumatically instead of hydraulically. Of course, the displacement of the carrying plate 10 may be obtained also electrically.

What I claim is:

1. A machine for feeding from a conveyor a predetermined number of uniform objects such as cans, boxes and the like to be packed onto trays, comprising a carrying plate to be reciprocated parallel to the longitudinal direction of said conveyor, a stationary abutment situated above the front end of said carrying plate when said plate is in its foremost position, said abutment limiting the feeding of the objects to be packed on said plate, a path extending below and parallel to the displacement direction of said plate, an inclining plane extending between said conveyor and said carrying plate for enabling the objects to be packed to slide down onto said carrying plate, means for displacing said trays, one by one, below said carrying plate to the front end of said plate simultaneously with the displacement of said plate to its foremost position, a latching device for preventing said objects from sliding down from said inclining plane when said carrying plate is in its rearmost position, a driver arranged below said carrying plate adapted, at the displacement forwards of said carrying plate to bring along a tray but at the return to its initial position adapted to leave the tray uninfluenced.

2. A machine for feeding from a conveyor a predetermined number of uniform objects such as cans, boxes and the like to be packed onto trays comprising a carrying plate to be reciprocated parallel to the longitudinal direction of said conveyor and adapted to support objects discharged from said conveyor, a stationary abutment situated above the front end of said carrying plate when said plate is in its foremost position, said abutment limiting the feeding of the objects to be packed on said plate, a path extending below and parallel to the displacement direction of said plate, an inclining plane extending between said conveyor and said carrying plate for enabling the objects to be packed to slide down onto said carrying plate, means for displacing said trays, one by one, below said carrying plate to the front end of said plate simultaneously with the displacement of said plate to its foremost position, a latching device for preventing said objects from sliding down from said inclining plane when said carrying plate is in its rearmost position, an abutment on the rear of said carrying plate, an abutment on the front end of said plate, said latching device at the front end of said inclining plane having a foldable flap, a stationary guide, a slide for folding said flap displaceable in said stationary guide when the latter, by said abutment on the rear of said carrying plate is displaced in forward direction at the end of the forward displacement of said plate and to be folded down by its own weight when said abutment on the front end of said carrying plate returns said slide at the end of the return movement of said carrying plate.

3. A machine for feeding from a conveyor a predetermined number of uniform objects such as cans, boxes and the like to be packed onto trays comprising a carrying plate to be reciprocated parallel to the longitudinal direction of said conveyor and adapted to support objects discharged from said conveyor, a stationary abutment situated above the front end of said carrying plate when said plate is in its foremost position, said abutment limiting the feeding of the objects to be packed on said plate, a path extending below and parallel to the displacement direction of said plate, an inclining plane extending between said conveyor and said carrying plate for enabling the objects to be packed to slide down onto said carrying plate, means for displacing said trays, one by one, below said carrying plate to the front end of said plate simultaneously with the displacement of said plate to its foremost position, a latching device for preventing said objects from sliding down from said inclining plane when said carrying plate is in its rearmost position, a springing stop abutment, a plurality of helical spring means located at the front end of said path for said trays, said spring means having one end extending into the movement path of the front border of a tray so that in case the tray is fed too far in forward direction, said spring means displace the tray rearwards to the correct position with the rear border abutting against said springing stop abutment.

References Cited
UNITED STATES PATENTS

| | | | |
|---|---|---|---|
| 1,269,115 | 6/1918 | Reese | 53—164 X |
| 3,225,513 | 12/1965 | Ehe | 53—160 |
| 1,824,432 | 9/1931 | Hendry | 53—159 X |
| 3,411,638 | 11/1968 | Dryon | 214—6 |

THERON E. CONDON, Primary Examiner

R. L. SPRUILL, Assistant Examiner